W. F. COCHRANE.
Grain Separator.
No. 37,126.
Patented Dec. 9, 1862.
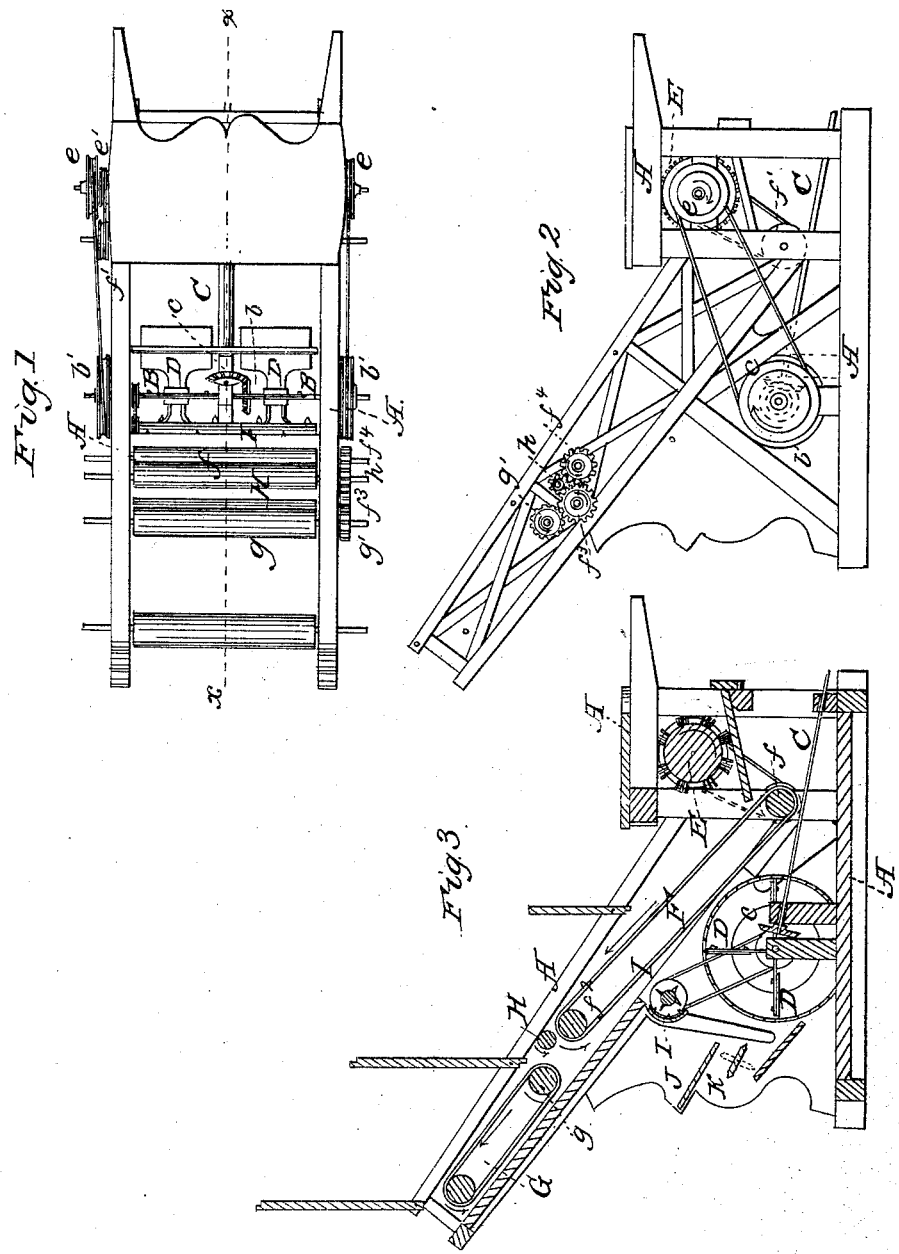

UNITED STATES PATENT OFFICE.

WILLIAM F. COCHRANE, OF SPRINGFIELD, OHIO, ASSIGNOR TO HIMSELF AND WARDER & CHILD, OF SAME PLACE.

IMPROVEMENT IN GRAIN THRASHERS AND SEPARATORS.

Specification forming part of Letters Patent No. 37,126, dated December 9, 1862.

CASE B.

*To all whom it may concern:*

Be it known that I, WILLIAM F. COCHRANE, of Springfield, in the county of Clarke and State of Ohio, have invented certain new and useful Improvements in Machinery for Thrashing and Separating Grain, of which the following is a full, clear, and exact description, reference being had to the accompanying drawings, which make part of this specification, and in which—

Figure 1 represents a plan or top view of a thrasher and operator embracing my improvements, the grain belt and straw-carrier (together with a portion of the framing) being removed in order to display the mechanism more clearly. Fig. 2 represents a view in elevation of one side of the same. Fig. 3 represents a vertical longitudinal section through the same, at the line $x\,x$ of Fig. 1, the grain-belt and straw-carrier being shown in position.

My invention relates to that class of machinery in which the grain is thrashed, separated, and winnowed at one continuous operation, and its object is to produce these results in a simple, convenient, and effective manner, to which end the improvements claimed under this patent consist, first, in combining with the grain-belt and straw-carrier a picker-shaft placed between the two, and driven by gearing from the grain-belt, as hereinafter described; secondly, in a supplementary spiked cylinder and concave located beneath the grain-belt to receive the grain as it falls therefrom, and to thrash out any head which may have escaped through the thrashing-cylinder, as hereinafter described; thirdly, in a series of inclined boards placed one above the other beneath the supplementary cylinder, so that the grain may fall from the cylinder upon them and be exposed to a blast from the fan in passing from one board to another, whereby I dispense with riddles, screens, or shaking-shoes, as hereinafter shown; fourthly, in combining with said inclined boards a valve which regulates the force of the blast passing between them, whereby I am enabled to adapt the mechanism to the varying density or quality of the grain.

In the accompanying drawings, which represent a convenient arrangement of parts for carrying out the objects of my invention, the mechanism is shown as supported in a stout frame, A. A counter shaft, B, turns in suitable bearings near the rear end of the frame. A line or driving shaft, C, extends lengthwise of the frame. One end of this shaft connects directly with the prime mover, while the other carries a bevel-wheel, $c$, which gears into a corresponding pinion, $b$, near the center of the counter-shaft. The fan, in this instance, is composed of floats or vanes D, mounted directly upon the counter-shaft and inclosed in a suitable casing. It is composed of two distinct sets of blades placed sufficiently far apart on the shaft to permit them to revolve freely without their ends coming in contact with the line-shaft or its bearings, which arrangement is clearly shown in Figs. 1 and 3 of the drawings. The thrashing-cylinder E is driven by bands or cords encircling pulleys $b'$ on each end of the counter-shaft, and corresponding ones $e$ on the cylinder-shaft, as shown in Fig. 1. The red arrows indicate the direction of the movements of the several parts. The grain-belt F is driven by a band or cord from a pulley, $e'$, on the cylinder-shaft, which cord encircles a corresponding pulley, $f'$, on the lower shaft, $f$, of the grain-belt. The straw-carrier G is driven by means of a spur-pinion, $g'$, on its lower shaft, $g$, which pinion is driven by a pinion, $f^4$, on the upper shaft, $f^2$, of the grain-belt, through an idle-wheel, $f^3$, placed between them. A picker-shaft, H, is located between the straw-carrier and grain-belt, and is driven by means of a pinion, $h$, which likewise gears into the idle-wheel $f^3$, by which arrangement motion is communicated to these several parts in a simple and convenient manner and the use of long belts avoided. A supplementary spiked cylinder, I, and concave I' are located beneath the grain-belt near its upper end. This cylinder is driven by a cord from the counter-shaft B (as shown in Fig. 3) and serves to thrash out any heads which may have escaped the thrashing-cylinder E. The concave I' is made so as to yield in case of the passage of any hard substance in order to prevent its breaking.

Instead of employing a riddle or screens, as usual, I arrange a series of inclined boards, J J', below the supplementary cylinder I. The blast from the fan passes over and between these boards, its force being regulated by means of the valve K, which turns on a pivot, and can be opened or closed at pleasure.

The operation of the machine is as follows: Motion is communicated to the various parts of the mechanism by means of any suitable prime mover. The grain and straw are fed into the thrashing-cylinder E, which separates the heads from the stalks, and releases the grain from its covering. The grain, straw, &c., then fall upon the grain-belt F, which conveys them to the back of the machine. The picker H agitates the straw and shakes out the grain, which falls down in the space between the ends of the grain-belt and straw-carrier, while the straw passes out at the back of the machine and falls upon the ground. The grain passes down through the supplementary cylinder I, which thrashes out any heads that may have escaped the thrashing-cylinder. As the grain falls from the supplementary cylinder it encounters a strong blast from the fan. The sound grain falls straight down into a suitable receptacle, while that which is lighter is blown over the edge of the lower inclined board, J', into a separate compartment. That portion which is still lighter passes over the upper board, J, into still another receptacle, while the chaff is blown out at the rear of the machine. The force of the blast is varied by turning the valve K, Fig. 3, on its pivot, as required, so as to vary its angle with respect to the inclined boards J J'.

What I claim under this patent as my invention is—

1. The combination of the grain belt, straw-carrier, and picker-shaft, when arranged and operated in the manner and for the purpose set forth.

2. A supplementary thrashing-cylinder, located beneath the grain-belt for the purpose of thrashing out any heads which may escape the thrashing-cylinder, when arranged and operating as herein described.

3. The combination of the supplementary cylinder and the fans with the inclined boards J J', substantially in the manner described, for the purpose set forh.

4. The combination of the inclined boards J J' and regulating-valve K with the fans D, as described, for the purpose of regulating the blast, as set forth.

In testimony whereof, I have hereunto subscribed my name.

WILLIAM F. COCHRANE.

Witnesses:
 WM. WARDER,
 JOHN H. WARDER.